（12） United States Patent
Yang et al.

(10) Patent No.: US 8,912,952 B2
(45) Date of Patent: Dec. 16, 2014

(54) GLOBAL POSITIONING SYSTEM DEVICE AND IONOSPHERE ERROR ESTIMATION METHOD THEREOF

(75) Inventors: Ming Yang, Tainan (TW); Shau-Shiun Jan, Tainan (TW); An-Lin Tao, Taipei (TW); Chih-Hung Li, New Taipei (TW); Shan-Yuan Yang, New Taipei (TW)

(73) Assignee: Institute for Information Industry, Taipei (TW)

( * ) Notice: Subject to any disclaimer, the term of this patent is extended or adjusted under 35 U.S.C. 154(b) by 435 days.

(21) Appl. No.: 13/329,573

(22) Filed: Dec. 19, 2011

(65) Prior Publication Data

US 2013/0147660 A1 Jun. 13, 2013

(30) Foreign Application Priority Data

Dec. 7, 2011 (TW) ............................. 100144957 A (51) Int. Cl.
*G01S 19/40* (2010.01)
*G01S 19/07* (2010.01)

(52) U.S. Cl.
USPC ................................. 342/357.23; 342/357.44

(58) Field of Classification Search
CPC .......... G01S 19/07; G01S 19/40; G01S 19/41
USPC ............. 342/357.22, 357.23, 357.25, 357.44; 701/468, 470
See application file for complete search history.

(56) References Cited

U.S. PATENT DOCUMENTS

| 6,801,854 | B1 | 10/2004 | Pemble et al. |
| 7,868,820 | B2 | 1/2011 | Kolb |
| 2011/0025555 | A1* | 2/2011 | Whitehead ................ 342/357.24 |
| 2012/0286991 | A1* | 11/2012 | Chen et al. ................ 342/357.23 |

* cited by examiner

*Primary Examiner* — Dao Phan
(74) *Attorney, Agent, or Firm* — Greer, Burns & Crain, Ltd.

(57) ABSTRACT

A global positioning system device and an ionosphere error estimation method thereof are provided. The global positioning system device is connected to a plurality of dual-band base stations, and receives a plurality of ionosphere pierce point coordinates and a plurality of ionosphere errors from the dual-band base stations. The global positioning system device calculates a user ionosphere error by an interpolation method based on the ionosphere pierce point coordinates and the ionosphere errors of the dual-band base stations and a user ionosphere pierce point coordinate of the global positioning system device.

6 Claims, 7 Drawing Sheets

GLOBAL POSITIONING SYSTEM DEVICE AND IONOSPHERE ERROR ESTIMATION METHOD THEREOF

This application claims priority to Taiwan Patent Application No. 100144957 filed on Dec. 7, 2011, which is hereby incorporated by reference in its entirety.

CROSS-REFERENCES TO RELATED APPLICATIONS

Not applicable.

BACKGROUND OF THE INVENTION

1. Field of the Invention

The present invention relates to a global positioning system (GPS) device and an ionosphere error estimation method thereof. More particularly, the GPS device and the ionosphere error estimation method thereof of the present invention accomplish estimation of a user ionosphere error by directly using ionosphere pierce point coordinates and ionosphere errors of reference base stations (BSs).

2. Descriptions of the Related Art

The global positioning system (GPS) mainly operates in the following principal: positioning signals are transmitted by satellites located in the outer space, and then a signal receiving device located on the earth can determine a position where the signal receiving device is currently located according to the positioning signals, thus accomplishing the positioning purpose. Because the GPS system can be widely used in various fields and is of great utility, related technologies are actively developed around the world. However, such a process of transmitting signals by satellites from the outer space to the earth tends to be interfered by various environmental factors, so errors may arise in the positioning result.

Specifically, the clock skew of the satellites themselves when the satellites transmit signals from the outer space to the earth, orbit deviations of the satellites, signal propagation through an ionosphere or a troposphere, and the clock error of the signal receiving device all have an influence on accuracy of the positioning result of the signal receiving device. Among these factors, errors caused due to propagation through an ionosphere have the greatest influence. Further speaking, signals propagating through the ionosphere will be seriously interfered by large amount of free electrons existing in the ionosphere. Even further, because free electrons distributed in the ionosphere are not in a regular or uniform way (actually in an irregular and time-varying way) and vary with the time and regions, which makes it difficult to estimate the interference on the satellite signals.

In the prior art, a primary solution to overcome the interference caused by the ionosphere is to dispose a dual-band receiver in the signal receiving device so that signals transmitted by the satellites in two different frequency bands can be received by the signal receiving device simultaneously and, accordingly, errors caused due to this environment factor can be eliminated. However, additional use of the dual-band receiver leads to a significantly increased cost, which hinders the widespread use of such signal receiving devices.

Additionally, there are also prior art solutions that use the Klobuchar model, the Satellite-Based Augmentation System, the Wide Area Differential Global Navigation Satellite System or the like to improve estimation and compensation of the ionosphere errors. However, the Klobuchar model can only eliminate about 50% of the ionosphere errors, so the accuracy it provides is still low; and because the approaches of using constant ionosphere grid points to calculate errors in the Satellite-Based Augmentation System and the Wide Area Differential Global Navigation Satellite System lack flexibility, they are not adaptive to abrupt variations of ionospheres in low latitude regions, which indirectly causes differences in terms of the using effect in different regions.

According to the above descriptions, an urgent need exists in the art to keep the signal receiving device at a low cost and, meanwhile, improve the accuracy of the ionosphere error estimation and the flexibility in use of the signal receiving device.

SUMMARY OF THE INVENTION

To solve the aforesaid problems, the present invention provides a global positioning system (GPS) device and an ionosphere error estimation method thereof, which calculate a user ionosphere error through interpolation method according to a plurality of ionosphere pierce point (IPP) coordinates and a plurality of ionosphere errors of a plurality of dual-band base stations (BSs) and a user IPP coordinate of the GPS device directly.

To achieve the aforesaid objective, the present invention provides an ionosphere error estimation method for a GPS device. The GPS device connects with a first dual-band base station and a second dual-band base station. The ionosphere error estimation method comprises the following steps of: (a) enabling the GPS device to receive a first ionosphere pierce point (IPP) coordinate and a first ionosphere error from the first dual-band base station, wherein the first dual-band base station receives a first positioning signal from a GPS satellite via a first IPP, calculates the first IPP coordinate according to the first IPP and calculates the first ionosphere error according to the first positioning signal; (b) enabling the GPS device to receive a second IPP coordinate and a second ionosphere error from the second dual-band base station, wherein the second dual-band base station receives a second positioning signal from the GPS satellite via a second IPP, calculates the second IPP coordinate according to the second IPP, and calculates the second ionosphere error according to the second positioning signal; (c) enabling the GPS device to receive a user positioning signal from the GPS satellite via a user IPP; (d) enabling the GPS device to calculate a user IPP coordinate according to the user IPP; and (e) enabling the GPS device to calculate a user ionosphere error through interpolation method according to the first IPP coordinate and the first ionosphere error of the first dual-band base station, the second IPP coordinate and the second ionosphere error of the second dual-band base station and the user IPP coordinate directly.

Another objective of the present invention is to provide a global positioning system (GPS) device, which connects with a first dual-band base station and a second dual-band base station. The GPS device comprises a network signal receiver, a GPS signal receiver and a processor. The network signal receiver is configured to receive a first IPP coordinate and a first ionosphere error from the first dual-band base station, and receive a second IPP coordinate and a second ionosphere error from the second dual-band base station, wherein the first dual-band base station receives a first positioning signal from a GPS satellite via a first IPP, calculates the first IPP coordinate according to the first IPP and calculates the first ionosphere error according to the first positioning signal, and the second dual-band base station receives a second positioning signal from the GPS satellite via a second IPP, calculates the second IPP coordinate according to the second IPP, and calculates the second ionosphere error according to the second positioning signal. The GPS signal receiver is configured to receive a user positioning signal from the GPS satellite via a user IPP. The processor is configured to calculate a user IPP coordinate according to the user IPP, and calculate a user ionosphere error through interpolation method according to the first IPP coordinate and the first ionosphere error of the first dual-band base station, the second IPP coordinate and the second ionosphere error of the second dual-band base station and the user IPP coordinate directly.

According to the above descriptions, the GPS device and the ionosphere error estimation method thereof of the present invention can calculate a user ionosphere error through interpolation method by according to IPP coordinates and ionosphere errors of base stations directly and by using a single-band signal receiver. Thereby, the cost of the GPS device can be remarkably reduced, and the accuracy of the ionosphere error estimation and the flexibility in use of the GPS device can be improved.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

In the following descriptions, the present invention will be explained with reference to embodiments thereof. However, these embodiments are not intended to limit the present invention to any specific environment, applications or particular implementations described in these embodiments. Therefore, description of these embodiments is only for purpose of illustration rather than to limit the present invention. It should be appreciated that, in the following embodiments and the attached drawings, elements unrelated to the present invention are omitted from depiction.

Figure 1A:
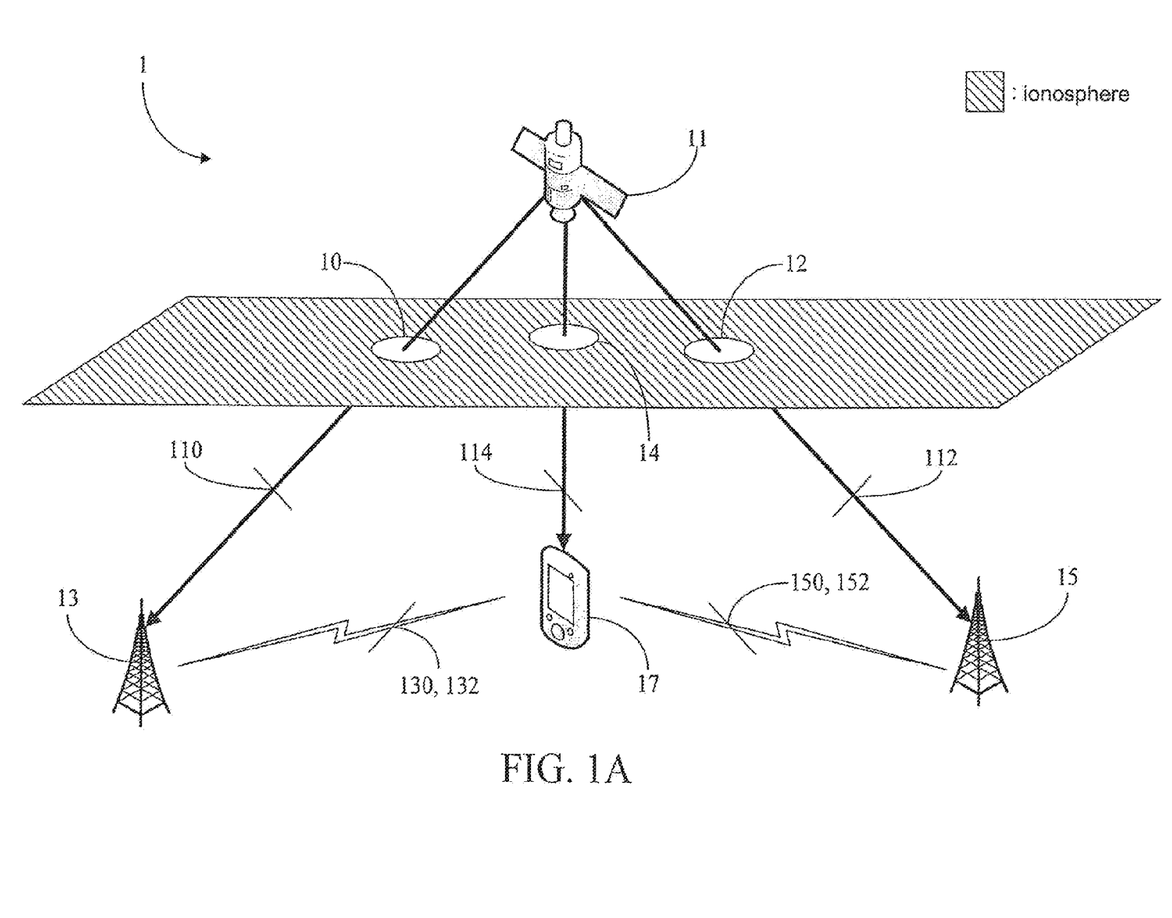
FIG. 1A is a schematic view of a GPS network according to a first embodiment of the present invention.

Referring to FIG. 1A, there is shown a schematic view of a global positioning system (GPS) network 1 of a first embodiment of the present invention. The GPS network comprises a GPS satellite 11, a first dual-band base station 13, a second dual-band base station 15 and a GPS device 17. The GPS device 17 has network connections with the first dual-band base station 13 and the second dual-band base station 15.

Figure 1B:
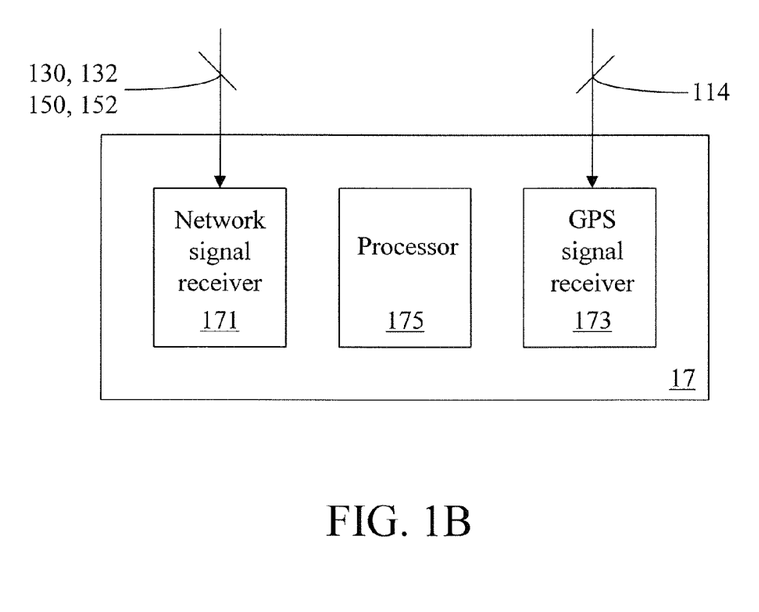
FIG. 1B is a schematic view of a GPS device according to a first embodiment of the present invention.
Figure 1C:
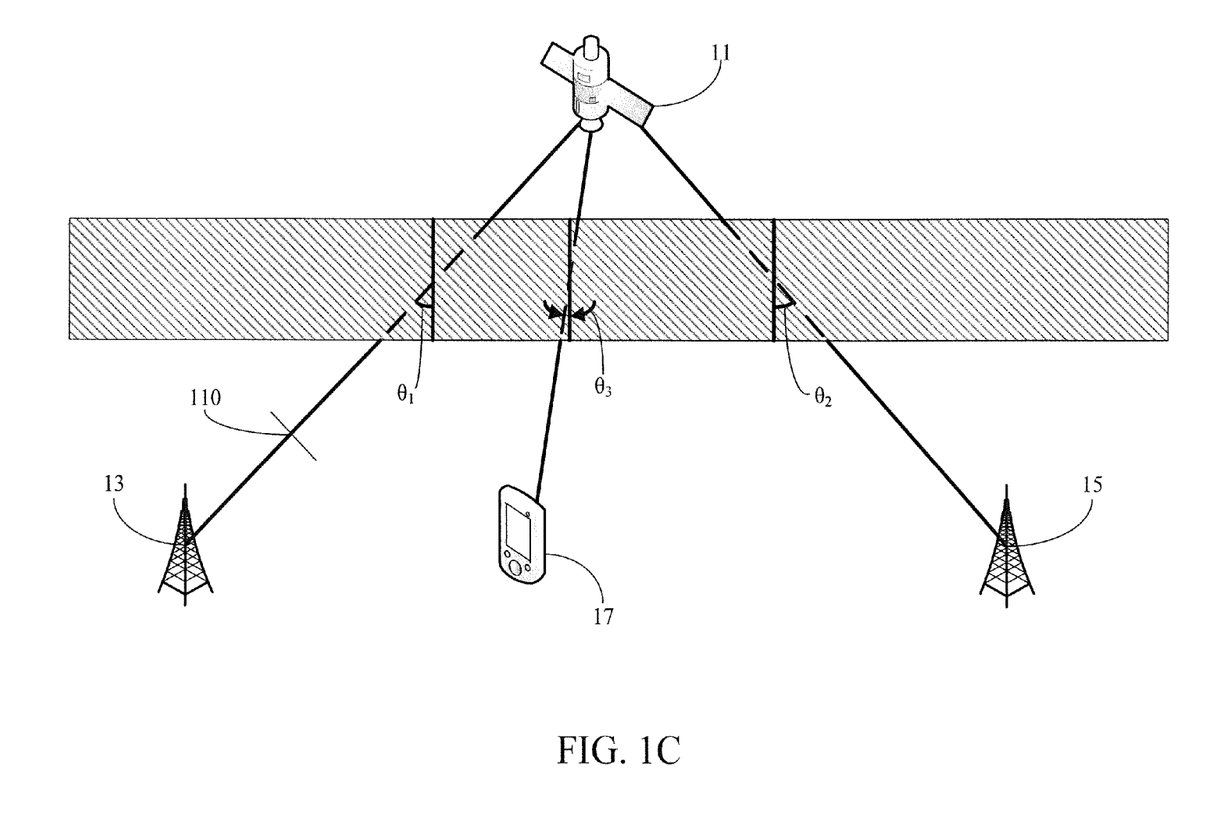
FIG. 1C is a schematic view of a GPS network according to a first embodiment of the present invention.

Referring to FIGS. 1B and 1C together, there is shown a schematic view of the GPS device 17 according to the first embodiment of the present invention. The GPS device 17 comprises a network signal receiver 171, a GPS signal receiver 173 and a processor 175. It shall be particularly appreciated that, the first dual-band base station 13 and the second dual-band base station 15 in the first embodiment are base stations each having a dual-band receiver, and are able to receive dual-band signals from different bands of the GPS satellite 11; and the GPS device 17 may be a mobile phone, a personal digital assistant (PDA), an on-board GPS navigation device or any device with a GPS computing capability. Functions of individual components of the GPS network 1 and interactions between them will be detail described here in below.

Firstly, the first dual-band base station 13 receives a first positioning signal 110 from the GPS satellite 11 via a first ionosphere pierce point (IPP) 10, and then calculates a first IPP coordinate value 130 and a first ionosphere error 132 according to the first positioning signal 110. Similarly, the second dual-band base station 15 receives a second positioning signal 112 from the GPS satellite 11 via a second IPP 12, and then calculates a second IPP coordinate value 150 and a second ionosphere error 152 according to the second positioning signal 110. It shall be particularly emphasized that calculation of the ionosphere coordinates and the ionosphere errors by the base stations according to the positioning signals and the signal receiving angles can be accomplished by conventional technologies, so this will not be further described herein.

Next, the network signal receiver 171 of the GPS device 17 receives the first IPP coordinate 130, the first ionosphere error 132, the second IPP coordinate 150 and the second ionosphere error 152 from the first dual-band base station 13 and the second dual-band base station 15 respectively via the network connections. Then, the GPS signal receiver 173 of the GPS device 17 receives a user positioning signal 114 from the GPS satellite 11 via a user IPP 14. Afterwards, the processor 175 of the GPS device 17 calculates a user IPP coordinate (not shown) according to the user IPP 14, and calculates a user ionosphere error through interpolation method according to the first IPP coordinate 130, the first ionosphere error 132, the second IPP coordinate 150, the second ionosphere error 152 and the user IPP coordinate directly.

More specifically, through the aforesaid signal transmissions, the GPS device 17 can obtain, in real time, the first IPP coordinate 130 corresponding to where the first dual-band base station 13 receives a signal through the ionosphere, a second IPP coordinate 150 corresponding to where the second dual-band base station 15 receives a signal through the ionosphere and the user IPP coordinate corresponding to where the GPS device 17 receives a signal through the ionosphere. Then, the processor 175 of the GPS device 17 can calculate position scale relationships between the first IPP coordinate 130, the second IPP coordinate 150 and the user coordinate. Thereby, when the first IPP 10 is with the first ionosphere error 132 and the second IPP 12 is with the second ionosphere error 152, the processor 175 can estimate a user ionosphere error, which is possibly occurred by the ionosphere at the user IPP 14 when the GPS device 17 receives a signal at the user IPP 14, through interpolation method according to the position scale relationship.

In the aforesaid way, the GPS device of the present disclosure can calculate the ionosphere error by directly using information related to the positioning signals received by the dual-band base stations. Further speaking, the GPS device of the present invention allows for use of a low-cost single-band module, and can successfully estimate ionosphere errors accurately by overcoming the limitations of the Satellite- Based Augmentation System and the Wide Area Differential Global Navigation Satellite System that constant ionosphere grid points must be used.

It shall be particularly emphasized that, the present invention may further utilize an angle at which a signal is received to convert the ionosphere errors so as to enhance the estimation accuracy. Referring to FIG. 1C together, there is shown a schematic view illustrating how an ionosphere error is converted according to a signal receiving angle in the first embodiment of the present invention. Specifically, because the GPS satellite 11 is not always located vertically above the first dual-band base station 13, the first dual-band base station 13 receives the first positioning signal 110 from the GPS satellite 11 via the first IPP 10 at a first angle $\theta_1$. Then, the first dual-band base station 13 decreases the first ionosphere error 132 according to the first angle $\theta_1$; in other words, the ionosphere error as the aspect of receiving the first positioning signal 110 at the first angle $\theta_1$ is converted through trigonometric function operations into an ionosphere error as the aspect of receiving the first positioning signal 110 at a vertical angle.

Likewise, because the GPS satellite 11 is not always located vertically above the second dual-band base station 15, the second dual-band base station 15 receives the second positioning signal 112 from the GPS satellite 11 via the second IPP 12 at a second angle $\theta_2$. Then, the second dual-band base station 15 decreases the second ionosphere error 152 according to the second angle $\theta_2$; in other words, the ionosphere error as the aspect of receiving the second positioning signal 112 at the second angle $\theta_2$ is converted into an ionosphere error as the aspect of receiving the second positioning signal 112 at a vertical angle through trigonometric function operations.

Similarly, the GPS signal receiver of the GPS device 17 receives the user positioning signal 114 from the GPS satellite 11 via the user IPP 14 also at a user angle $\theta_3$. When the user ionosphere error is obtained through signal transmissions and calculations as described in the first embodiment, the user ionosphere error corresponds to a case in which the user positioning signal 114 is received vertically by the GPS 17. Correspondingly, the processor 175 magnifies the user ionosphere error through trigonometric function operations according to the user angle $\theta_3$; in other words, the user ionosphere error as the aspect of receiving the user positioning signal 114 at a vertical angle is converted into an ionosphere error as the aspect of receiving the user positioning signal 114 at the user angle $\theta_3$. Thereby, errors possibly generated due to different angles at which the satellite signals are received by the individual base stations and the GPS device can be eliminated in the aforesaid way, thus making the user ionosphere error more accurate.

Figure 2:
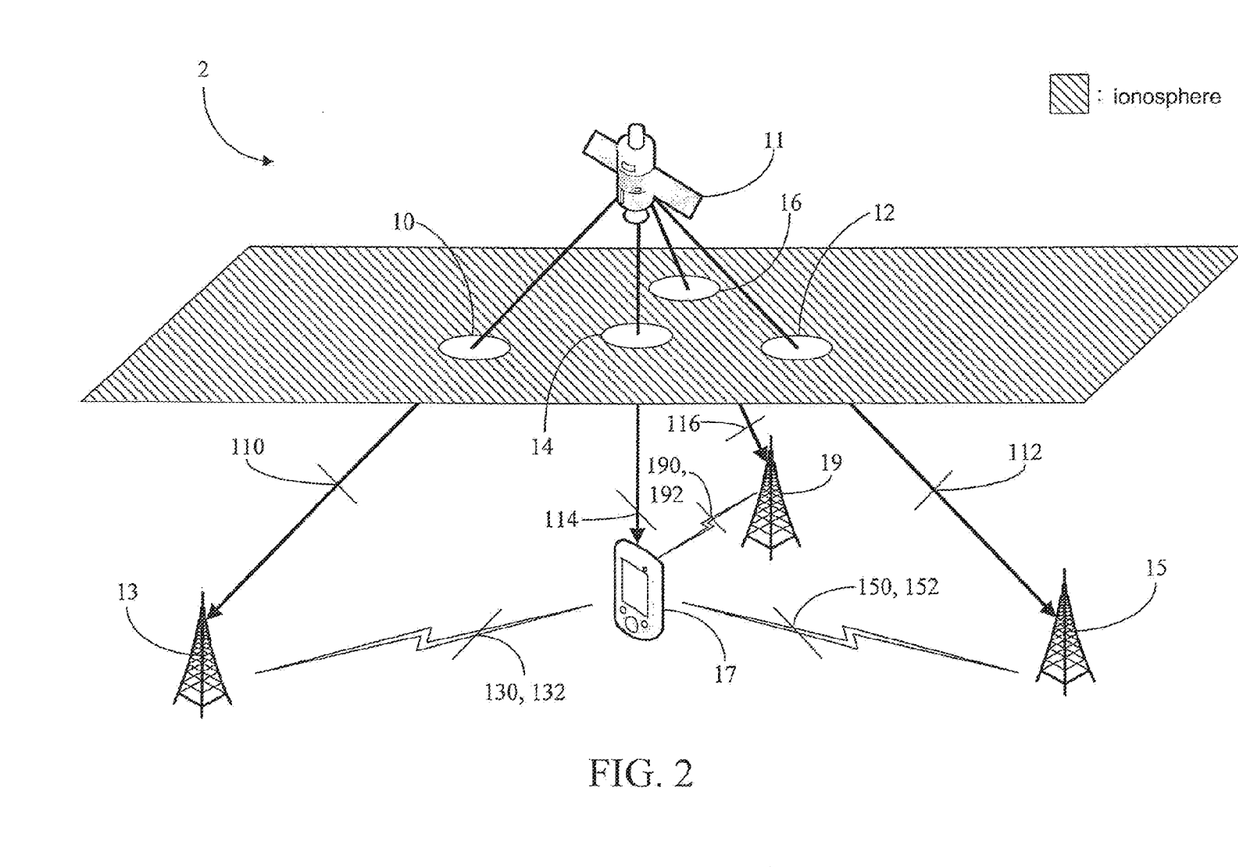
FIG. 2 is a schematic view of a GPS network according to a second embodiment of the present invention.

Referring to FIG. 2, there is shown a schematic view of a GPS network 2 according to a second embodiment of the present invention. It shall be particularly appreciated that, the hardware structure and the network connection environment in the second embodiment are similar to those of the first embodiment, so elements bearing the same symbols and functions thereof will not be described again herein. The second embodiment differs from the first embodiment in that, the GPS network 2 of the second embodiment further comprises a third dual-band base station 19.

Specifically, the third dual-band base station 19 receives a third positioning signal 116 from the GPS satellite 11 via a third IPP 16, and then calculates a third IPP coordinate 190 and a third ionosphere error 192 according to the third positioning signal 116. Similarly, the network signal receiver 171 of the GPS device 17 receives the first IPP coordinate 130, the first ionosphere error 132, the second IPP coordinate 150, the second ionosphere error 152, the third IPP coordinate 190 and the third ionosphere error 192 from the first dual-band base station 13, the second dual-band base station 15 and the third dual-band base station 19 respectively via the network connections.

Likewise, the GPS signal receiver 173 of the GPS device 17 receives the user positioning signal 114 from the GPS satellite 11 via the user IPP 14. The processor 175 of the GPS device 17 then calculates the user IPP coordinate according to the user IPP 14, and calculates the user ionosphere error through interpolation method according to the first IPP coordinate 130, the first ionosphere error 132, the second IPP coordinate 150, the second ionosphere error 152, the third IPP coordinate 190, the third ionosphere error 192 and the user IPP coordinate directly.

Similar to the first embodiment, the GPS device 17 can obtain, in real time, the first IPP coordinate value 130 corresponding to where the first dual-band base station 13 receives a signal through the ionosphere, a second IPP coordinate 150 corresponding to where the second dual-band base station 15 receives a signal through the ionosphere, a third IPP coordinate 190 corresponding to where the third dual-band base station 19 receives a signal through the ionosphere, and the user IPP coordinate corresponding to where the GPS device 17 receives a signal through the ionosphere. Then, the processor 175 of the GPS device 17 can calculate position scale relationships between the first IPP coordinate 130, the second IPP coordinate 150, the third IPP coordinate 190 and the user IPP coordinate. Thereby, when the first IPP 10 is with the first ionosphere error 132, the second IPP 12 is with the second ionosphere error 152 and the third IPP 16 is with the third ionosphere error 192, the processor 175 can estimate a user ionosphere error, which is occurred by the ionosphere when the GPS device 17 receives a signal at the user IPP 14, through interpolation method according to the position scale relationship.

It shall be particularly appreciated that, the present invention has no limitation on the number of dual-band base stations to which the GPS device is connected. Taking Taiwan as an example, dual-band reference base stations can be deployed in the east, the south, the west and the north respectively. Therefore, when the GPS device of the present invention is used in Taiwan, positioning related information from the four dual-band base stations can be used simultaneously to accomplish the positioning of the GPS device directly. Thereby, it is unnecessary for the GPS device of the present invention to be limited by the constant ionosphere grid points when being located in a relatively small area; and instead, information from nearby reference base stations can be utilized directly for positioning purpose, which significantly improves the positioning accuracy of the GPS device no matter in a low latitude and high ionosphere-density area or in a high latitude and low ionosphere-density area.

Figure 3A:
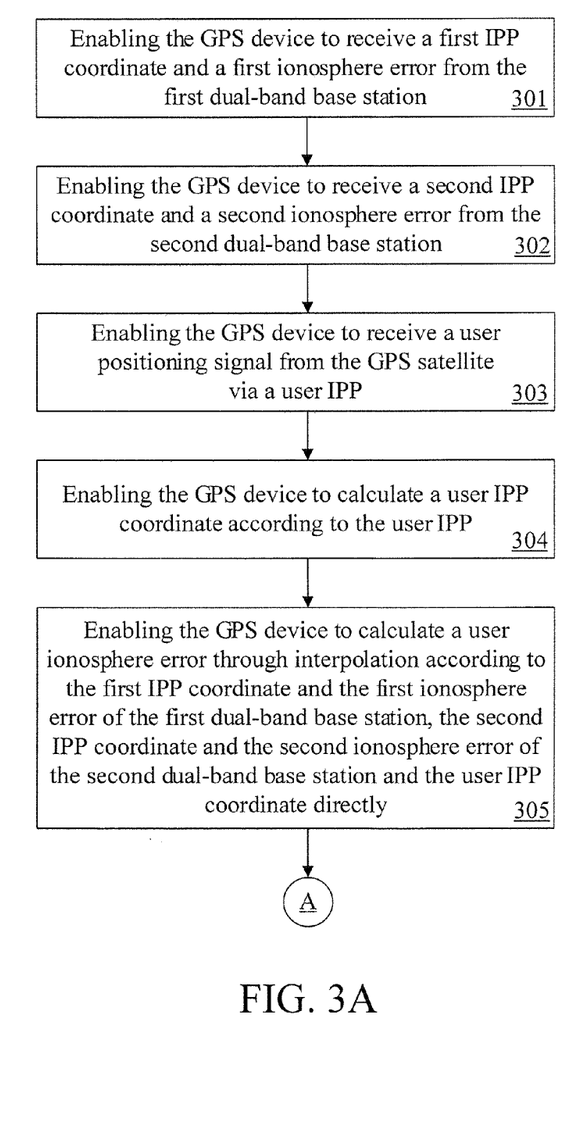
FIG. 3A is a flowchart diagram of an ionosphere error estimation method according to a third embodiment of the present invention.

Referring to FIG. 3A, there is shown a flowchart diagram of an ionosphere error estimation method according to a third embodiment of the present invention. The method of the third embodiment is for use in a GPS device (e.g., the GPS device described in the aforesaid embodiments). The GPS device connects to a first dual-band base station and a second dual-band base station. Detailed steps of the ionosphere error estimation method of the third embodiment are described as follow.

Firstly, step 301 is executed to enable the GPS device to receive a first IPP coordinate and a first ionosphere error from the first dual-band base station. The first dual-band base station receives a first positioning signal from a GPS satellite via a first IPP, calculates the first IPP coordinate according to the first IPP and calculates the first ionosphere error according to the first positioning signal.

Then, step 302 is executed to enable the GPS device to receive a second IPP coordinate and a second ionosphere error from the second dual-band base station. The second dual-band base station receives a second positioning signal from the GPS satellite via a second IPP, calculates the second IPP coordinate according to the second IPP, and calculates the second ionosphere error according to the second positioning signal.

Step 303 is executed to enable the GPS device to receive a user positioning signal from the GPS satellite via a user IPP. Step 304 is executed to enable the GPS device to calculate a user IPP coordinate according to the user IPP. Finally, step 305 is executed to enable the GPS device to calculate a user ionosphere error through interpolation method according to the first IPP coordinate and the first ionosphere error of the first dual-band base station, the second IPP coordinate and the second ionosphere error of the second dual-band base station and the user IPP coordinate directly. It shall be particularly appreciated that, the way in which the user ionosphere error is calculated through interpolation method is the same as what described in the aforesaid embodiments and, thus, will not be described again herein.

Additionally, the present invention may further utilize an angle at which a signal is received to convert the ionosphere errors so as to enhance the estimation accuracy. Specifically, because the GPS satellite is not always located vertically above the first dual-band base station, the first dual-band base station receives the first positioning signal from the GPS satellite via the first IPP at a first angle and decreases the first ionosphere error according to the first angle; in other words, the ionosphere error when the first positioning signal is received at the first angle is converted into an ionosphere error when the first positioning signal is received at a vertical angle through trigonometric function operations.

Likewise, because the GPS satellite is not always located vertically above the second dual-band base station, the second dual-band base station receives the second positioning signal from the GPS satellite via the second IPP at a second angle and decreases the second ionosphere error according to the second angle; in other words, the ionosphere error as the aspect of receiving the second positioning signal at the second angle is converted into an ionosphere error as the aspect of receiving the second positioning signal at a vertical angle through trigonometric function operations. Likewise, the step 303 may further enable the GPS device to receive the user positioning signal from the GPS satellite via the user IPP at a user angle.

Figure 3B:
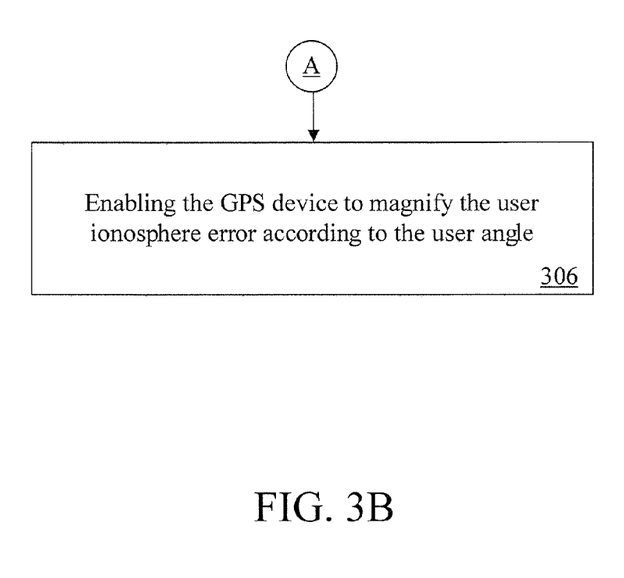
FIG. 3B is a detailed flowchart diagram of the ionosphere error estimation method according to the third embodiment of the present invention.

Referring to FIG. 3B, there is shown a detailed flowchart diagram of the ionosphere error estimation method according to the third embodiment of the present invention. Specifically, step 306 may be further executed in the ionosphere error estimation method to enable the GPS device to magnify the user ionosphere error through trigonometric function operations according to the user angle. In other words, the user ionosphere error as the aspect of receiving the user positioning signal in a vertical angle is converted into an ionosphere error as the aspect of receiving the user positioning signal at the user angle. Thereby, errors possibly generated due to different angles at which the satellite signals are received by the individual base stations and the GPS device can be eliminated in the aforesaid way, thus making the user ionosphere error more accurate.

Figure 4:
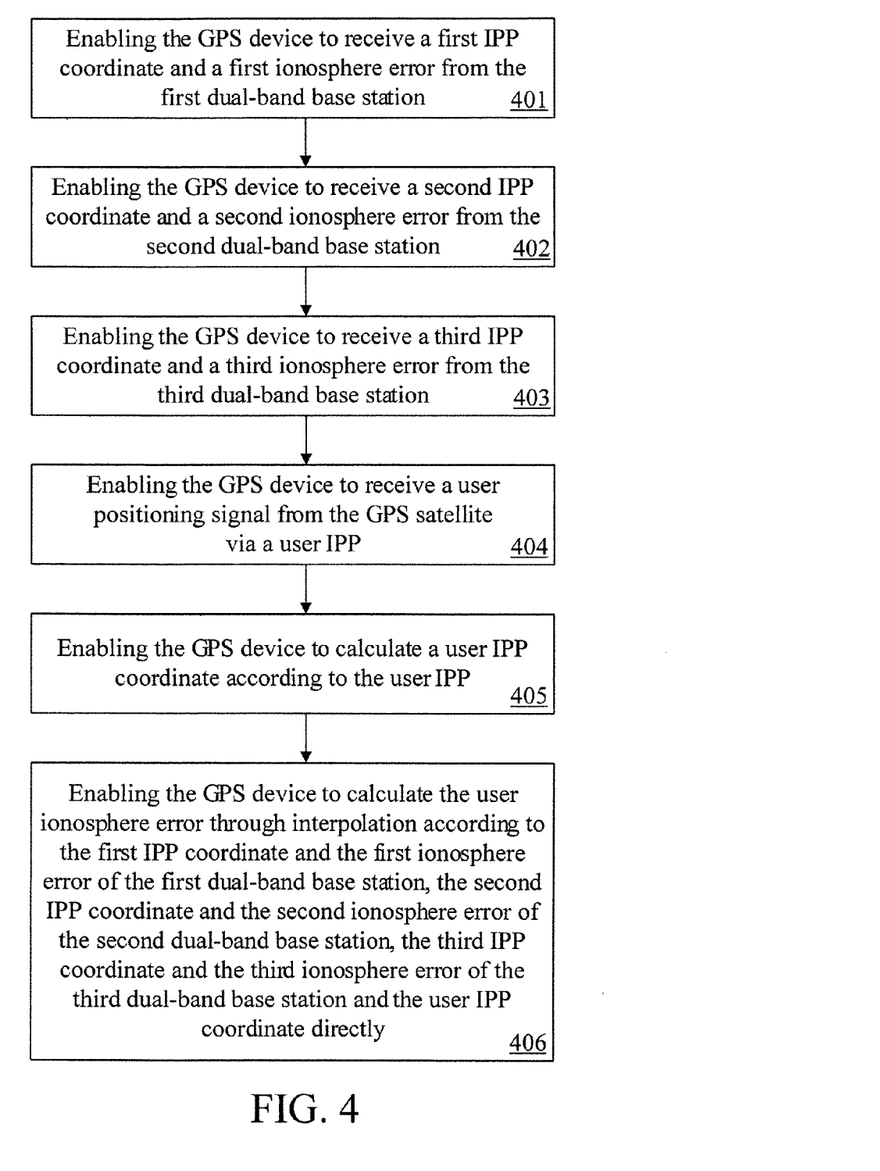
FIG. 4 is a flowchart diagram of an ionosphere error estimation method according to a fourth embodiment of the present invention.

Referring to FIG. 4, there is shown a flowchart diagram of an ionosphere error estimation method according to a fourth embodiment of the present invention. The method of the fourth embodiment is used in a GPS device (e.g., the GPS device described in the aforesaid embodiments). The GPS device connects to a first dual-band base station, a second dual-band base station and a third dual-band base station. Detailed steps of the ionosphere error estimation method of the fourth embodiment are described as follows.

Firstly, step 401 is executed to enable the GPS device to receive a first IPP coordinate and a first ionosphere error from the first dual-band base station. The first dual-band base station receives a first positioning signal from a GPS satellite via a first IPP, calculates the first IPP coordinate according to the first IPP and calculates the first ionosphere error according to the first positioning signal.

Then, step 402 is executed to enable the GPS device to receive a second IPP coordinate and a second ionosphere error from the second dual-band base station. The second dual-band base station receives a second positioning signal from the GPS satellite via a second IPP, calculates the second IPP coordinate according to the second IPP, and calculates the second ionosphere error according to the second positioning signal.

Then, step 403 is executed to enable the GPS device to receive a third IPP coordinate and a third ionosphere error from the third dual-band base station. The third dual-band base station receives a third positioning signal from the GPS satellite via a third IPP, calculates the third IPP coordinate according to the third IPP, and calculates the third ionosphere error according to the third positioning signal.

Next, step 404 is executed to enable the GPS device to receive a user positioning signal from the GPS satellite via a user IPP. Step 405 is executed to enable the GPS device to calculate a user IPP coordinate according to the user IPP. Finally, step 406 is executed to enable the GPS device to calculate a user ionosphere error through interpolation method according to the first IPP coordinate and the first ionosphere error of the first dual-band base station, the second IPP coordinate and the second ionosphere error of the second dual-band base station, the third IPP coordinate and the third ionosphere error of the third dual-band base station and the user IPP coordinate directly.

According to the above descriptions, the GPS device and the ionosphere error estimation method thereof of the present invention can calculate a user ionosphere error through interpolation method according to a plurality of IPP coordinates and a plurality of ionosphere errors of a plurality of dual-band base stations and a user IPP coordinate of the GPS device directly and by using a single-band signal receiver. Thereby, by use of the GPS device and the ionosphere error estimation method thereof of the present invention, the hardware cost can be remarkably reduced and the accuracy of the ionosphere error estimation at various latitudes and in various regions can be improved.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. An ionosphere error estimation method for use in a global positioning system (GPS) device, the GPS device connecting with a first dual-band base station and a second dual-band base station, the ionosphere error estimation method comprising the following steps of:

(a) enabling the GPS device to receive a first ionosphere pierce point (IPP) coordinate and a first ionosphere error from the first dual-band base station, wherein the first dual-band base station receives a first positioning signal from a GPS satellite via a first IPP, calculates the first IPP coordinate according to the first IPP and calculates the first ionosphere error according to the first positioning signal;

(b) enabling the GPS device to receive a second IPP coordinate and a second ionosphere error from the second dual-band base station, wherein the second dual-band base station receives a second positioning signal from the GPS satellite via a second IPP, calculates the second IPP coordinate according to the second IPP, and calculates the second ionosphere error according to the second positioning signal;

(c) enabling the GPS device to receive a user positioning signal from the GPS satellite via a user IPP;

(d) enabling the GPS device to calculate a user IPP coordinate according to the user IPP; and (e) enabling the GPS device to calculate a user ionosphere error through interpolation method according to the first IPP coordinate and the first ionosphere error of the first dual-band base station, the second IPP coordinate and the second ionosphere error of the second dual-band base station and the user IPP coordinate directly.

2. The ionosphere error estimation method as claimed in claim 1, wherein the GPS device further connects to a third dual-band base station, and the ionosphere error estimation method further comprises the following step of:

(f) enabling the GPS device to receive a third IPP coordinate and a third ionosphere error from the third dual-band base station, wherein the third dual-band base station receives a third positioning signal from the GPS satellite via a third IPP, calculates the third IPP coordinate according to the third IPP, and calculates the third ionosphere error according to the third positioning signal;

wherein the step (e) further enables the GPS device to calculate the user ionosphere error through interpolation method according to the first IPP coordinate and the first ionosphere error of the first dual-band base station, the second IPP coordinate and the second ionosphere error of the second dual-band base station, the third IPP coordinate and the third ionosphere error of the third dual-band base station and the user IPP coordinate directly.

3. The ionosphere error estimation method as claimed in claim 1, wherein the first dual-band base station receives the first positioning signal from the GPS satellite via the first IPP at a first angle and minifies the first ionosphere error according to the first angle, and the second dual-band base station receives the second positioning signal from the GPS satellite via the second IPP at a second angle and decreases the second ionosphere error according to the second angle, the step (c) further comprising the following step of:

(c1) enabling the GPS device to receive the user positioning signal from the GPS satellite via the user IPP at a user angle;

wherein the ionosphere error estimation method further comprises the following step of:

(f) enabling the GPS device to magnify the user ionosphere error according to the user angle.

4. A global positioning system (GPS) device, which connects with a first dual-band base station and a second dual-band base station, the GPS device comprising:

a network signal receiver, being configured to receive a first ionosphere pierce point (IPP) coordinate and a first ionosphere error from the first dual-band base station, and receive a second IPP coordinate and a second ionosphere error from the second dual-band base station, wherein the first dual-band base station receives a first positioning signal from a GPS satellite via a first IPP, calculates the first IPP coordinate according to the first IPP and calculates the first ionosphere error according to the first positioning signal, and the second dual-band base station receives a second positioning signal from the GPS satellite via a second IPP, calculates the second IPP coordinate according to the second IPP, and calculates the second ionosphere error according to the second positioning signal;

a GPS signal receiver, being configured to receive a user positioning signal from the GPS satellite via a user IPP; and a processor, being configured to calculate a user IPP coordinate according to the user IPP, and calculate a user ionosphere error through interpolation method according to the first IPP coordinate and the first ionosphere error of the first dual-band base station, the second IPP coordinate and the second ionosphere error of the second dual-band base station and the user IPP coordinate directly.

5. The GPS device as claimed in claim 4, wherein the GPS device further connects to a third dual-band base station, and the GPS signal receiver is further configured to receive a third IPP coordinate and a third ionosphere error from the third dual-band base station, wherein the third dual-band base station receives a third positioning signal from the GPS satellite via a third IPP, calculates the third IPP coordinate according to the third IPP, and calculates the third ionosphere error according to the third positioning signal, and the processor further calculates the user ionosphere error through interpolation method according to the first IPP coordinate and the first ionosphere error of the first dual-band base station, the second IPP coordinate and the second ionosphere error of the second dual-band base station, the third IPP coordinate and the third ionosphere error of the third dual-band base station and the user IPP coordinate directly.

6. The GPS device as claimed in claim 4, wherein the first dual-band base station receives the first positioning signal from the GPS satellite via the first IPP at a first angle and minifies the first ionosphere error according to the first angle, and the second dual-band base station receives the second positioning signal from the GPS satellite via the second IPP at a second angle and decreases the second ionosphere error according to the second angle, the GPS signal receiver is further configured to receive the user positioning signal from the GPS satellite via the user IPP at a user angle, and the processor is further configured to magnify the user ionosphere error according to the user angle.

* * * * *